United States Patent [19]

Lagas

[11] 3,987,154

[45] Oct. 19, 1976

[54] PROCESS FOR REMOVAL OF HYDROGEN SULPHIDE AND AMMONIA FROM GASEOUS STREAMS

[75] Inventor: Jan Adolf Lagas, Monnikendam, Netherlands

[73] Assignee: Comprimo B.V., Amsterdam, Netherlands

[22] Filed: Oct. 7, 1974

[21] Appl. No.: 512,963

[30] Foreign Application Priority Data

Oct. 10, 1973    Netherlands...................... 7313902

[52] U.S. Cl. ............................. 423/574 R; 423/237
[51] Int. Cl.$^2$.......................................... C01B 17/04
[58] Field of Search .......... 423/237, 351, 573, 574; 55/70, 73

[56] References Cited

UNITED STATES PATENTS

| | | | |
|---|---|---|---|
| 3,773,912 | 11/1973 | Spangler | 423/574 |
| 3,819,816 | 6/1974 | Wunderlich et al. | 423/574 X |
| 3,822,337 | 7/1974 | Wunderlich et al. | 423/574 X |
| 3,877,879 | 4/1975 | Palm et al. | 423/574 X |

FOREIGN PATENTS OR APPLICATIONS

| | | | |
|---|---|---|---|
| 1,212,052 | 3/1966 | Germany | 423/237 |
| 686,469 | 1/1953 | United Kingdom | 423/573 |

*Primary Examiner*—G. O. Peters
*Attorney, Agent, or Firm*—Haseltine, Lake & Waters

[57] ABSTRACT

Hydrogen sulphide and ammonia are removed from gaseous streams comprising these compounds by combustion of ammonia into nitrogen and water vapor and partial combustion of hydrogen sulphide into sulphur dioxide, whereby hydrogen sulphide reacts with the sulphur dioxide formed in a molar ratio of 2:1 under formation of elementary sulphur and water, by mixing all gases which are to be combusted before causing them to enter at least one burner. Preferably the combustion air required for the ammonia containing gas stream and the combustion air required for the hydrogen sulphide rich gas stream are controlled separately, after which both air streams are united.

5 Claims, No Drawings

PROCESS FOR REMOVAL OF HYDROGEN SULPHIDE AND AMMONIA FROM GASEOUS STREAMS

BACKGROUND OF THE INVENTION

The invention relates to a process for removal of hydrogen sulphide and ammonia from gaseous streams comprising these compounds by combustion of ammonia into nitrogen and water vapor and partial combustion of hydrogen sulphide into sulphur dioxide, whereby hydrogen sulphide reacts with the sulphur dioxide formed in a molar ratio of 2:1 under formation of elementary sulphur and water.

A partial combustion of hydrogen sulphide to sulphur dioxide and combination of sulphur dioxide with the double molar amount of hydrogen sulphide, forming elementary sulphur and water, is generally known as the Claus process.

This commonly known process is generally applied at present in oil refineries, where the process plays an important role in the conversion of gases originating from the removal of sulphur compounds from crude petroleum distillates.

In the processing of crude oil gaseous products originate and besides desired products like propane, butane, gasoline, kerosene and combustion oil a residue remains. In the sulphur removal from these products the sulphur present therein is largely converted into hydrogen sulphide by the hydrogen gas added.

The hydrogen sulphide containing gases obtained from these sources are separated from the still present hydrocarbons in a gas purification plant (mostly an "amine treater"). The hydrogen sulphide rich gas issuing from this "amine treater" cannot be directly blown off into the atmosphere; therefore it is converted in a sulphur recovery plant into elementary sulphur and combustion products.

The combustion products may be vented through the chimney.

Since several refinery gases and liquids are contacted with water and/or steam during their processing, another waste product of the oil refinery is the polluted water, commonly referred to as "sour water". This polluted water comprises amongst others ammonia and hydrogen sulphide in dissolved condition and therefore it may neither be directly dispensed with. In the stripping of this sour water with steam a mixture of gases is obtained, in which usually ammonia and hydrogen sulphide are present in substantially equal volumetric quantities.

Till recently this mixture of gases was directly combusted in an afterburn furnace or in a torch, since a conventional sulphur recovery plant is not suitable for processing ammoniacal gas. The presence of ammonia may give rise to cloggings, because ammonia may combine with acidic compounds like $H_2S$, $SO_2$, $SO_3$ and nitrogen oxides forming salts which may deposit as solids.

Because of its hydrogen sulphide content a search was made for processes to use this gas nevertheless in a sulphur recovery plant according to the Claus process. It was found that the removal of ammonia is obtained by combustion of the mixture of hydrogen sulphide gas and ammonia gas in a sulphur recovery plant according to the Claus process with sufficient air in order to burn up the ammonia gas substantially completely to nitrogen gas and water vapor.

The hydrogen sulphide gas from the amine treater and the sour water stripper is partially combusted to sulphur dioxide. After combustion the molar ratio of hydrogen sulphide to sulphur dioxide should be 2:1.

The sulphur dioxide formed reacts with still present hydrogen sulphide according to the equilibrium reaction

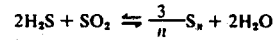

$$2H_2S + SO_2 \rightleftharpoons \frac{3}{n}S_n + 2H_2O .$$

Hydrocarbons possibly present in the gas are combusted in the flame into water vapor and carbon dioxide gas.

The combustion may take place in two ways: Firstly by total combustion of the gas from the sour water stripper. Secondly by mixing the gas from the sour water stripper with the gas from the amine treater and subsequent simultaneous combustion.

When the gas from the sour water stripper is separately completely combusted, there arises: either an insufficient amount of sulphur dioxide because of binding with the hydrogen sulphide gas coming from the amine treater under formation of sulphur and water, so that a part of the hydrogen sulphide gas from the amine treater should still be combusted; or a too large amount of sulphur dioxide, in which case the desired ratio of hydrogen sulphide to sulphur dioxide of 2:1 cannot be reached.

If in this first case there is formed such a large proportion of sulphur dioxide that the desired ratio of 2:1 will be approximated, then only a small proportion of the hydrogen sulphide from the amine treater should be combusted, which will make the flame unstable.

Another drawback of complete combustion of the gas from the "sour water stripper" is that because of the high combustion temperature and the oxidizing environment a continuing oxidation will take place besides the combustion into nitrogen gas and water vapor, giving rise to the formation of nitrogen oxides. Also a partial further oxidation of sulphur dioxide into sulphur trioxide takes place. Because besides such combustion products there always remains some unburnt ammonia gas in the combustion products, corresponding ammonium salts may be formed, like ammonium sulphate, ammonium sulphite and possibly ammonium nitrate and ammonium nitrite. These salts give rise to cloggings.

Besides the above-mentioned problems also a fast corrosion of the burner has been established in the complete combustion of the gas from the sour water stripper, caused by the high combustion temperature.

SUMMARY OF THE INVENTION

It was now found that when the gas from the sour water stripper was mixed with the gas from the amine treater before combustion takes place and when furthermore the conditions mentioned hereinbelow are satisfied, all indicated problems are solved.

Accordingly the invention provides a process as mentioned in the introduction of the specification, characterized in that all gases which are to be combusted are mixed before entering at least one burner.

Because the gas originating from the sour water stripper has a high temperature (about 90° C) and comprises much water vapor as well as hydrogen sulphide and ammonia in substantially equal quantities, there is a water condensation risk and a risk of formation of NH₄HS on cooling. Because the gas originating from the amine treater is relatively cool (about 40° C) and is usually available in much greater quantities, condensation will take place on mixing these two gases unless the gas originating from the amine treater is preheated.

Accordingly the hydrogen sulphide rich gas stream coming from the amine treater is preheated to such a temperature that the gaseous mixture will reach a temperature of 70° C or higher in a preferred embodiment of the invention. The temperature of 70° C is chosen because below this temperature NH₄HS may be formed.

In order to obtain the desired end result the proportion of combustion air fed to the burner should be accurately dosed. This dosing can be controlled by means responding to the total amount of gaseous mixture to be combusted in the burner feed. However, when under fluctuating gas proportions from the amine treater on the one side and from the sour water stripper on the other side the mutual ratio of the amounts of gases will not remain within narrow limits, the volumetric percentages of hydrogen sulphide and ammonia will fluctuate after mixing. This causes the exit ratio of hydrogen sulphide to sulphur dioxide to fluctuate, too, when the sensing device is placed between the place of mixing the two streams and the burner entrance, so that the ratio may deviate from the desired ratio of 2:1.

Therefore, according to a further preferred embodiment of the invention, both gas streams will have a separate air control. That is to say that in each gas stream a separate sensing organ is provided, and that both sensing organs are controlling through separate control means their own combustion air stream. Both air streams are united before entrance into the burner.

The burner preferably is of the type in which the gases to be combusted are fed through a centrally located conduit, while on issuing from this conduit they are intensively mixed with the combustion air circulating around it.

Further it was found that in this way of burning the combustion of ammonia gas is dependent on the residence time of the gases in the combustion chamber. The combustion of the ammonia gas is optimal if the gases may reside at least 0.8 sec. in the combustion chamber. This should be therefore taken into account in designing a combustion chamber for the plant. The wall temperature of the parts of the plant which contact the combustion gases should be kept above 150° C in order to preclude deposition of ammonium salts which may arise from traces of ammonia remaining after the combustion.

DETAILED DESCRIPTION OF THE INVENTION.

The advantages of the new process are:
1. The amounts of hydrogen sulphide present are converted with a high yield into elementary sulpur, even when relatively much ammonia is present.
2. No deposition of ammonium salts takes place, which could give rise to cloggings.
3. The flame in the burner remains stable even under a high proportion of ammonia in the gas to be combusted.
4. Because of the reductive action of the hydrogen sulphide remaining after combustion formation of sulphur trioxide is precluded, so that no ammonium sulphate will deposit in the plant and no sulphate formation will take place in the catalyst.
5. Because of the reductive action of the hydrogen sulphide remaining after combustion and the lower combustion temperature (caused by the partial combustion of the total gas mixture) formation of nitrogen oxides is precluded in the combustion of ammonia, so that no ammonium nitrate or nitrite will deposit in the plant and no additional air pollution will take place by emission of nitrogen oxides.
6. Because of the lower combustion temperature no corrosion of the burner takes place.
7. Even large variations in the ammonia content do not have any influence on the proper operation of the plant and do not require special care from operators.

The invention is now further elucidated by virtue of the following examples.

EXAMPLE 1

A gas mixture originating from an amine treater and a sour water stripper with hydrogen sulphide and ammonia as components was burnt in a plant for sulphur, hydrogen and ammonia removal. The ammonia was combusted into nitrogen and water vapor, and the hydrogen sulphide was partially combusted into sulphur dioxide and water vapour, so as to react the hydrogen sulphide in the molar ratio of 2:1 with the sulphur dioxide formed under formation of elementary sulphur and water. The gas from the amine treater was preheated before it was mixed with the gas from the sour water stripper, the temperature of the total gas mixture before entry into the burner was 80° C. The composition of the gas mixture was in the average 89 volume percent of $H_2S$, 2.5 volume percent of $NH_3$, 2.5 volume percent of hydrocarbons and 6 volume percent of $H_2O$, in a total amount of 2500 kg/h. The gas mixture was combusted with air under a gauge pressure of 0.45 kg/cm².

Since the amount of gas from the sour water stripper was small with respect to the amount of gas from the amine treater, the required amount of combustion air was controlled with one gas ratio controller based on the total amount of gas mixture.

The residence time in the combustion chamber was greater than 0.8 sec. The wall temperature of the apparatuses in the plant, which came into contact with the burnt gas, was everywhere above 150° C. The $NH_3$ content measured in the burnt gas was 6 to 22 volumetric parts per million.

The yield of the plant with respect to the sulphur recovery was between 97 and 98 percent.

The purity of the sulphur was over 99.9 percent. The traces of $NH_3$ in the burnt gas had no influence whatsoever on the proper functioning of the plant not even on a longer term.

EXAMPLE 2

In another plant of the same kind as in Example 1 the same process was applied. An amount of 6400 kg/h, originating from an amine treater, with an average composition of 93 volume percent of $H_2S$, 2 volume percent of hydrocarbons and 5 volume percent of $H_2O$, was heated from 40° to 80° C before the gas was mixed with 900 kg/h of gas originating from a sour water stripper with a temperature of 85° C and an average composition of 30 volume percent of $H_2S$, 30 volume percent of $NH_3$ and 40 volume percent of $H_2O$.

The temperature of the gas mixture before entry into the burner amounted to 80° C.

The gas mixture was combusted with air under a gauge pressure of 0.40 kg/cm².

The required amount of combustion air was separately controlled for the gas from the amine treater and for the gas from the sour water stripper with a gas ratio controller each. The two air streams were thereafter united before entry into the burner.

The residence time in the combustion chamber was greater than 0.8 sec. The wall temperature of the apparatuses in the plant was again above 150° C. The assayed $HN_3$ content in the burnt gas was between 10 and 40 volumetric parts per million.

The yield of the plant with respect to sulphur recovery was above 97 percent.

The sulphur had a purity which was higher than 99.9 percent. The traces of $NH_3$ in the burnt gas had no influence whatsoever on the proper functioning of the plant, not even on a longer term.

EXAMPLE 3

Repetition of the method mentioned in Example 1 and 2 in four other plants of the same kind confirmed the obtained results again. All plants appeared to function properly, and on the long run, too.

What I claim is:

1. A process for simultaneous removal of hydrogen sulphide and ammonia from gaseous streams by complete combustion of ammonia into nitrogen and water vapor and combustion of part of the hydrogen sulphide into sulphur dioxide, whereby the remainder of the hydrogen sulphide reacts with the sulphur dioxide formed in a molar ratio of 2:1 under formation of elementary sulphur and water, which comprises mixing at least one stream of an ammonia containing gas with at least one stream of a gas containing more hydrogen sulphide than in said ammonia containing gas and feeding said mixture into a burner which is of the type in which all of the gases to be combusted are fed through a central conduit and on issuing are mixed intensively with the required amount of combustion air circulating around it and wherein the amount of combustion air required for the ammonia containing gas stream and the amount of combustion air required for the hydrogen sulphide rich gas stream are controlled separately by means responding to to the flow ratios of the streams after which both air streams are united.

2. The process of claim 1, wherein the hydrogen sulphide and ammonia containing gas stream is mixed with a preheated hydrogen sulphide rich gas stream to form a mixed stream with a temperature of 70° C or higher in which no $NH_4HS$ formation takes place.

3. The process of claim 1, wherein the residence time of the gases in the combustion chamber is at least 0.8 sec.

4. The process as defined in claim 1, wherein the burnt gas is collected in chambers, the walls of which have a temperature of at least 150° C.

5. The process of claim 1 wherein the ammonia containing gas is the gas obtained by the steam stripping of oil refinery sour water and the hydrogen sulphide containing gas is the gas separated from hydrocarbons during the processing of crude oil gaseous products in an amine treater.

* * * * *